US012222664B2

(12) United States Patent
Saito et al.

(10) Patent No.: US 12,222,664 B2
(45) Date of Patent: Feb. 11, 2025

(54) DEVELOPING DEVICE, PROCESS CARTRIDGE, AND IMAGE FORMING APPARATUS INCLUDING AN ENTRANCE SEAL WHICH CONTACTS AN IMAGE BEARER

(71) Applicants: Kei Saito, Tokyo (JP); Yoshihiro Fujiwara, Kanagawa (JP); Masaki Takahashi, Tokyo (JP); Yuuki Tsuchiya, Kanagawa (JP)

(72) Inventors: Kei Saito, Tokyo (JP); Yoshihiro Fujiwara, Kanagawa (JP); Masaki Takahashi, Tokyo (JP); Yuuki Tsuchiya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/235,885

(22) Filed: Aug. 21, 2023

(65) Prior Publication Data

US 2024/0077813 A1 Mar. 7, 2024

(30) Foreign Application Priority Data

Sep. 1, 2022 (JP) ................................ 2022-139189

(51) Int. Cl.
*G03G 15/08* (2006.01)
*G03G 15/09* (2006.01)

(52) U.S. Cl.
CPC ..... *G03G 15/0898* (2013.01); *G03G 15/0817* (2013.01); *G03G 15/0812* (2013.01);
(Continued)

(58) Field of Classification Search
CPC ........... G03G 15/0817; G03G 15/0898; G03G 2215/0877; G03G 2215/1648
(Continued)

(56) References Cited

U.S. PATENT DOCUMENTS

2003/0059228 A1* 3/2003 Tatsumi ............. G03G 15/0812 399/274
2006/0029435 A1* 2/2006 Kasai ................... G03G 21/186 430/122.6

(Continued)

FOREIGN PATENT DOCUMENTS

JP 2006-145815 A 6/2006
JP 2013-117563 A 6/2013
WO WO-2023075832 A1 * 5/2023

*Primary Examiner* — Robert B Beatty
(74) *Attorney, Agent, or Firm* — XSENSUS LLP

(57) ABSTRACT

A developing device includes a developer bearer rotatable in a rotation direction and forming a developing range, a holder, and an entrance seal. The holder has a facing face facing the developer bearer upstream from the developing range in the rotation direction, a support face defining a part of an outer face of the developing device, and a relay face extending from one end of the support face to one end of the relay face connected to the facing face to form an acute tip portion closer to the developing range than the one end. The entrance seal has a free end projecting from the one end as a cantilever, and a length of the entrance seal from a tip of the free end of the entrance seal to the one end is shorter than a length of the relay face from the acute tip portion to the one end.

15 Claims, 5 Drawing Sheets

(52) U.S. Cl.
CPC ..... *G03G 15/0815* (2013.01); *G03G 15/0921* (2013.01); *G03G 2215/0648* (2013.01); *G03G 2215/0838* (2013.01); *G03G 2215/0877* (2013.01); *G03G 2221/1648* (2013.01)

(58) Field of Classification Search
USPC .................................................. 399/103, 105
See application file for complete search history.

(56) References Cited

U.S. PATENT DOCUMENTS

| | | | | |
|---|---|---|---|---|
| 2014/0286673 | A1* | 9/2014 | Ota .................... | G03G 15/0898 399/103 |
| 2016/0170329 | A1* | 6/2016 | Kimura ............. | G03G 15/0942 399/103 |
| 2016/0238966 | A1 | 8/2016 | Oshikawa et al. | |
| 2016/0259271 | A1* | 9/2016 | Ooyoshi ............ | G03G 15/0817 |
| 2017/0108795 | A1 | 4/2017 | Oshikawa et al. | |
| 2022/0413417 | A1* | 12/2022 | Muramatsu ........ | G03G 15/0813 |

* cited by examiner

DEVELOPING DEVICE, PROCESS CARTRIDGE, AND IMAGE FORMING APPARATUS INCLUDING AN ENTRANCE SEAL WHICH CONTACTS AN IMAGE BEARER

CROSS-REFERENCE TO RELATED APPLICATION

This patent application is based on and claims priority pursuant to 35 U.S.C. § 119(a) to Japanese Patent Application No. 2022-139189, filed on Sep. 1, 2022, in the Japan Patent Office, the entire disclosure of which is hereby incorporated by reference herein.

BACKGROUND

Technical Field

Embodiments of the present disclosure relate to a developing device to develop a latent image formed on an image bearer such as a photoconductor drum, a process cartridge including the developing device, and an image forming apparatus including the developing device.

Related Art

One type of image forming apparatus such as a copier or a printer includes a developing device. The developing device includes a flexible sheet as an entrance seal disposed at an upstream portion of a developing range in a rotation direction of a photoconductor drum to prevent toner from scattering.

Specifically, the developing device includes a developing roller as a developer bearer. The developing roller faces the photoconductor drum to form the developing range. The developing device includes a holder such as a casing covering the upstream portion of the developing range. The flexible sheet as the entrance seal is adhered to the holder such that a free end of the flexible sheet is in contact with the photoconductor drum. The flexible sheet disposed in the developing device as described above reduces toner scattering, that is, toner blown out from the upstream portion of the developing range.

SUMMARY

This specification describes an improved developing device that includes a developer bearer, a holder, and an entrance seal. The developer bearer is rotatable in a rotation direction and forms a developing range to develop a latent image on an image bearer. The holder has a facing face, a support face, and a relay face. The facing face faces a portion of the developer bearer upstream from the developing range in the rotation direction of the developer bearer. The support face defines a part of an outer face of the developing device. The relay face extends from one end of the support face to one end of the relay face connected to the facing face to form an acute tip portion. The acute tip portion is closer to the developing range than the one end of the support face. The entrance seal has a free end projecting from the one end of the support face as a cantilever, and a first length of the entrance seal from a tip of the free end of the entrance seal to the one end of the support face is shorter than a second length of the relay face from the acute tip portion to the one end of the support face at least at a part of a center portion of the entrance seal in a longitudinal direction of the entrance seal.

This specification also describes an image forming apparatus including the developing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
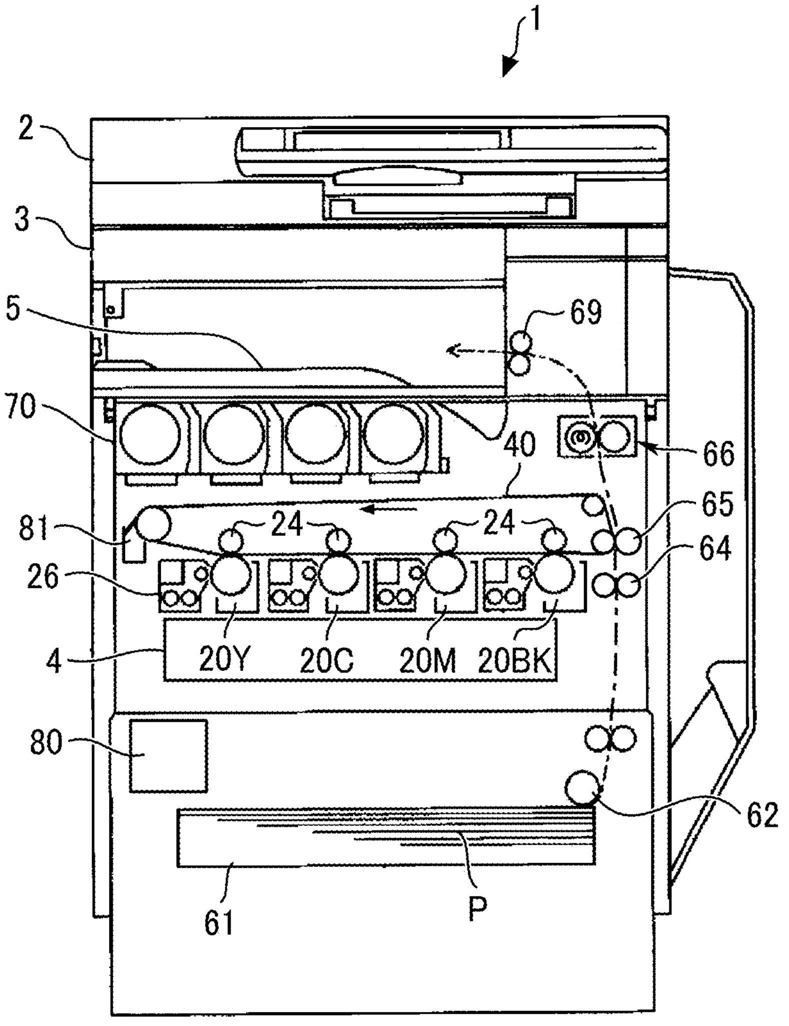
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," and "the" are intended to include the plural forms as well, unless the context clearly indicates otherwise.

With reference to the drawings, embodiments of the present disclosure are described below. Identical reference numerals are assigned to identical or equivalent components and a description of those components may be simplified or omitted.

Initially, with reference to FIG. 1, a configuration and operation of an image forming apparatus 1 according to a present embodiment of the present disclosure is described below.

The image forming apparatus 1 according to the present embodiment is a tandem multicolor image forming apparatus in which multiple process cartridges 20Y, 20M, 20C, and 20BK are arranged in parallel to each other, facing an intermediate transfer belt 40. In each of the process cartridges 20Y, 20M, 20C, and 20BK, a developing device 26 is disposed to face a photoconductor drum 21 as illustrated in FIG. 2.

In FIG. 1, the image forming apparatus 1, which is a color copier in the present embodiment, includes a document feeder 2, a scanner 3 as a document reading device, and an exposure device 4 as a writing device. The document feeder 2 conveys a document to the scanner 3. The scanner 3 reads image data of the document. The exposure device 4 emits a laser beam based on input image data. In addition, the image forming apparatus 1 includes the process cartridges 20Y, 20M, 20C, and 20BK to form yellow, magenta, cyan and black toner images on respective surfaces of the photoconductor drums, respectively, and an intermediate transfer belt 40 on which the yellow, magenta, cyan and black toner images are transferred and superimposed. The image forming apparatus 1 further includes a sheet feeder 61, a secondary transfer roller 65, and a fixing device 66. The sheet feeder 61 accommodates sheets P such as paper sheets. The secondary transfer roller 65 transfers the toner image formed on the intermediate transfer belt 40 onto the sheet P. The fixing device 66 fixes an unfixed toner image on the sheet P. The image forming apparatus 1 still further includes toner containers 70, cleaning devices 23, an intermediate transfer belt cleaner 81, and a waste-toner container 80. The toner containers 70 supply toner of the four colors to the respective developing devices 26 of the process cartridges 20Y, 20M, 20C, and 20BK. The waste-toner container 80 collects the toner collected by the cleaning devices 23 (see FIG. 2) and untransferred toner collected by the intermediate transfer belt cleaner 81.

Figure 2:
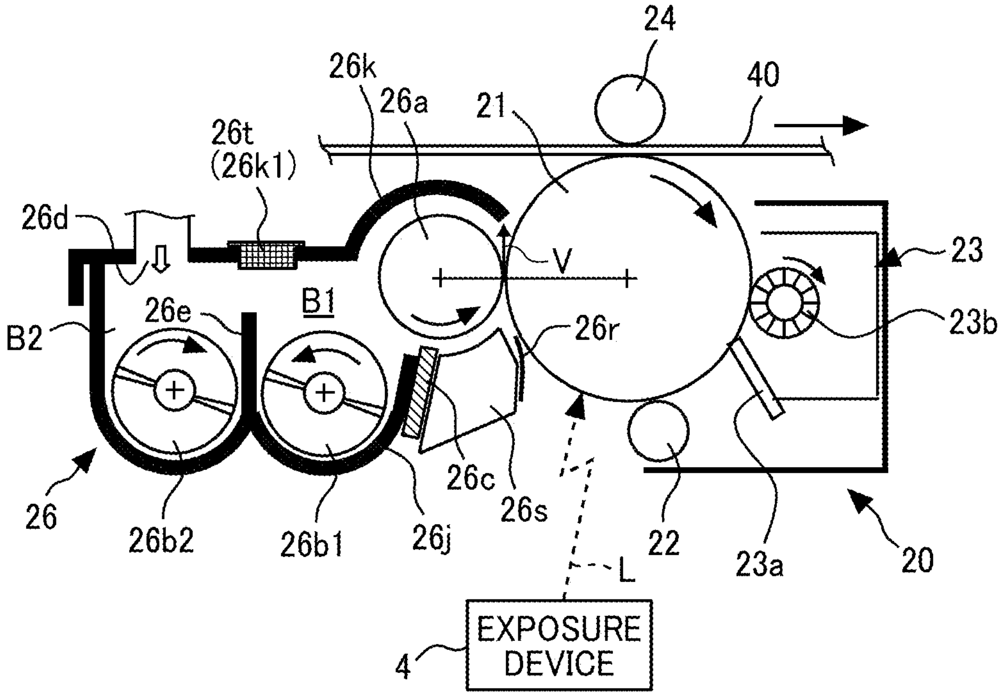
FIG. 2 is a cross-sectional view of an image forming unit of the image forming apparatus in FIG. 1.

Each of the process cartridges 20Y, 20M, 20C, and 20BK includes the photoconductor drum 21 as an image bearer, a charging device 22, and a cleaning device 23, which are united as a single unit as illustrated in FIG. 2. Each of the process cartridges 20Y, 20M, 20C, and 20BK, which is expendable, is removed from a body of the image forming apparatus 1 and replaced with a new one when depleted in the body of the image forming apparatus 1. The developing device 26 is disposed to face the photoconductor drum 21 in each of the process cartridges 20Y, 20M, 20C, and 20BK. Each of the developing devices 26, which is expendable, is removed from the body of the image forming apparatus 1 and replaced with a new one when each of the developing device 26 reaches the end of life. An operator may independently perform an attachment and detachment operation of the developing device 26 with respect to the body of the image forming apparatus 1, and an attachment and detachment operation of the process cartridges 20Y, 20M, 20C, and 20BK with respect to the body of the image forming apparatus 1, as different operations. In the process cartridges 20Y, 20M, 20C, and 20BK, yellow, magenta, cyan, and black toner images are formed on the respective photoconductor drums 21 as the image bearers.

A description is provided of image forming processes of the image forming apparatus 1 to form a color toner image on a recording medium.

A conveyance roller of the document feeder 2 conveys a document on a document table onto a platen (that is, an exposure glass) of the scanner 3. The scanner 3 optically scans image data for the document on the platen. The yellow, magenta, cyan, and black image data are transmitted to the exposure device 4. The exposure device 4 irradiates the photoconductor drums 21 (see FIG. 2) of the corresponding process cartridges 20Y, 20M, 20C, and 20BK with laser beams (as exposure light) L based on the yellow, magenta, cyan, and black image data, respectively.

Each of the four photoconductor drums 21 rotates clockwise in FIGS. 1 and 2. The surface of the photoconductor drum 21 is uniformly charged at a position where the photoconductor drum 21 faces the charging device 22 that is a charging roller, which is referred to as a charging process. Thus, the surface of the photoconductor drum 21 is charged to a certain potential. When the charged surface of the photoconductor drum 21 reaches a position to receive the laser beam L emitted from the exposure device 4, an electrostatic latent image based on the image data is formed on the surface of the photoconductor drum 21, which is referred to as an exposure process.

The laser beam L corresponding to the yellow image data is emitted to the surface of the photoconductor drum 21 in the process cartridge 20Y, which is the first from the left in FIG. 1 among the four process cartridges 20Y, 20M, 20C, and 20BK. A polygon mirror that rotates at high velocity directs the laser beam L for the yellow image data to the surface of the photoconductor drum 21 along a rotation axis direction of the photoconductor drum 21 (i.e., the main scanning direction). Thus, an electrostatic latent image corresponding to the yellow image data is formed on the photoconductor drum 21 charged by the charging device 22. Similarly, the laser beam L corresponding to the cyan image data is emitted to the surface of the photoconductor drum 21 in the second process cartridge 20C from the left in FIG. 1, thus forming an electrostatic latent image for cyan on the surface of the photoconductor drum 21. The laser beam L corresponding to the magenta image data is emitted to the surface of the photoconductor drum 21 in the third process cartridge 20M from the left in FIG. 1, thus forming an electrostatic latent image for magenta on the surface of the photoconductor drum 21. The laser beam L corresponding to the black image data is emitted to the surface of the photoconductor drum 21 in the fourth process cartridge 20BK from the left in FIG. 1, thus forming an electrostatic latent image for black on the surface of the photoconductor drum 21.

Then, the surface of the photoconductor drum 21 bearing the electrostatic latent image for each color reaches a position opposite the developing device 26. The developing device 26 supplies toner onto the surface of the photoconductor drum 21 and develops the electrostatic latent image on the photoconductor drum 21 into a toner image, which is referred to as a development process.

After the development process, the surface of the photoconductor drum 21 reaches a position opposite the intermediate transfer belt 40. Each of primary transfer rollers 24 is disposed at the position where the photoconductor drum 21 faces the intermediate transfer belt 40 such that the primary transfer roller 24 contacts an inner circumferential surface of the intermediate transfer belt 40. At the positions of the primary transfer rollers 24, the toner images on the photoconductor drums 21 are sequentially transferred to and superimposed on the intermediate transfer belt 40, forming a multicolor toner image thereon, which is referred to as a primary transfer process.

After the primary transfer process, the surface of the photoconductor drum 21 reaches a position opposite the cleaning device 23. The cleaning device 23 collects untransferred toner remaining on the photoconductor drum 21, which is referred to as a cleaning process. The untransferred toner collected in the cleaning device 23 passes through a waste-toner conveyance tube and is collected as waste toner in the waste-toner container 80. Subsequently, a residual potential of the surface of the photoconductor drum 21 is removed at a position opposite the discharger, and a series of image forming processes performed on the photoconductor drum 21 is completed.

Meanwhile, the surface of the intermediate transfer belt 40, onto which the single-color toner images on the photoconductor drums 21 are superimposed, moves in the direction indicated by arrow in FIG. 1 and reaches a position opposite the secondary transfer roller 65. The secondary transfer roller 65 secondarily transfers the multicolor toner image on the intermediate transfer belt 40 to the sheet P, which is referred to as a secondary transfer process. After the secondary transfer process, the surface of the intermediate transfer belt 40 reaches a position opposite the intermediate transfer belt cleaner 81. The intermediate transfer belt cleaner 81 collects the untransferred toner on the intermediate transfer belt 40 to complete a series of transfer processes on the intermediate transfer belt 40. The untransferred toner collected in the intermediate transfer belt cleaner 81 passes through the waste-toner conveyance tube and is collected as waste toner in the waste-toner container 80.

The sheet P is conveyed from the sheet feeder 61 to the position of the secondary transfer roller 65 via a registration roller pair 64. Specifically, a feed roller 62 feeds the sheet P from the top of multiple sheets P stored in the sheet feeder 61. The sheet P is conveyed to the registration roller pair 64 through a sheet conveyance passage. The sheet P that has reached the registration roller pair 64 is conveyed toward the position of the secondary transfer roller 65, timed to coincide with the arrival of the multicolor toner image on the intermediate transfer belt 40.

Subsequently, the sheet P, onto which the multicolor image is transferred, is conveyed to the fixing device 66. The fixing device 66 includes a fixing roller and a pressure roller pressing against each other. In a nip between the fixing roller and the pressure roller, the multicolor image is fixed on the sheet P. After the fixing process, an output roller pair 69 ejects the sheet P as an output image to the exterior of the image forming apparatus 1, and the ejected sheet P is stacked on an output tray 5 to complete a series of image forming processes.

Figure 3:
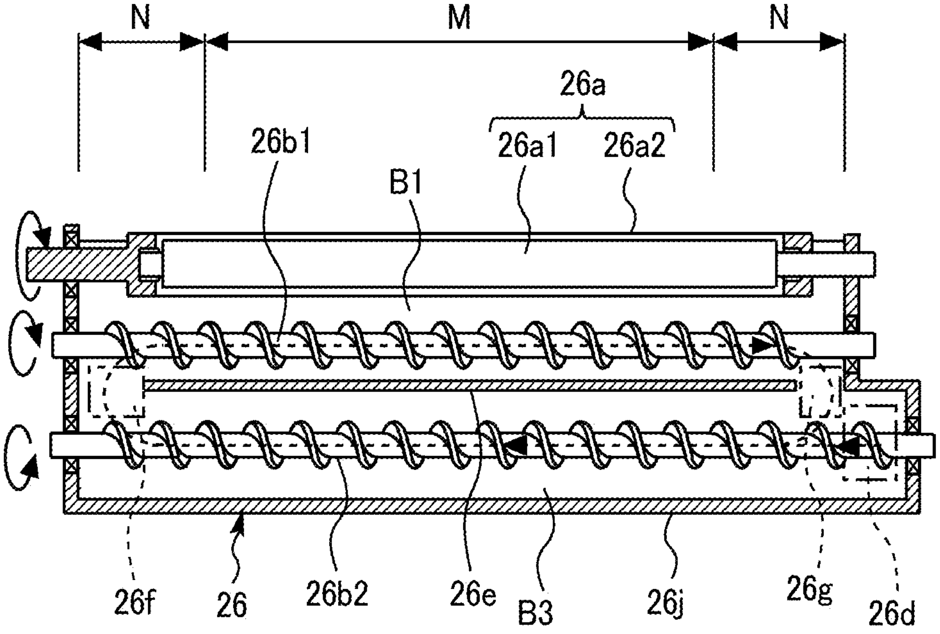
FIG. 3 is a cross-sectional view of a developing device taken along a rotation axis direction of a developing roller that is a longitudinal direction of the developing roller.

With reference to FIGS. 2 and 3, the image forming units of the image forming apparatus 1 are described in detail below.

The four image forming units disposed in the main body of the image forming apparatus 1 have a similar configuration except the color of the toner used in the image forming processes. Parts of the image forming unit such as the process cartridge and the developing device are illustrated without suffixes Y, M, C, and BK, which denote the colors of the toner, in the drawings.

As illustrated in FIG. 2, the process cartridge 20 includes the photoconductor drum 21 as the image bearer, the charging device 22, and the cleaning device 23, which are stored in a case of the process cartridge 20 as a single unit. The photoconductor drum 21 is an organic photoconductor designed to be charged with a negative polarity and includes a photosensitive layer formed on a drum-shaped conductive support. The charging device 22 is the charging roller including a conductive core and an elastic layer of moderate resistivity coated on the conductive core. A power supply applies a predetermined voltage to the charging device 22 that is the charging roller, and the charging device 22 uniformly charges the surface of the photoconductor drum 21 opposite the charging device 22. The cleaning device 23 includes a cleaning blade 23*a* and a cleaning roller 23*b* that contact the photoconductor drum 21. For example, the cleaning blade 25*a* is made of rubber, such as urethane rubber, and contacts the surface of the photoconductor drum 21 at a specified angle with a specified pressure. The cleaning roller 25*b* is a brush roller in which brush bristles are provided around a core.

As illustrated in FIGS. 2 and 3, the developing device 26 includes a developing roller 26*a* as a developer bearer, a first conveying screw 26*b*1 as a first conveyor facing the developing roller 26*a*, a partition 26*e*, a second conveying screw 26*b*2 as a second conveyor facing the first conveying screw 26*b*1 via the partition 26*e*, and a doctor blade 26*c* as a developer regulator facing the developing roller 26*a* to regulate an amount of developer borne on the developing roller 26*a*. The developing roller 26*a* faces the photoconductor drum 21 to form a developing range. The developing device 26 according to the present embodiment includes an entrance seal 26*r*. The entrance seal 26*r* is a flexible sheet (in other words, a first flexible sheet). The tip 26*r*1 of the entrance seal 26*r* that is a free end (see FIG. 4A) contacts the photoconductor drum at a position upstream from the developing range. The entrance seal is described in detail later.

The developing device 26 stores a two-component developer including carrier and toner. In the present embodiment, the average particle diameter of the toner is set to about 5.2 μm, and the average particle diameter of the carrier is set to about 35 μm. In addition, the toner concentration is set to about 7 wt %, and the amount of the developer in the developing device 26 is set to about 250 g.

The developing roller 26*a* is disposed facing the photoconductor drum 21 with a small gap (that is referred to as a developing gap), thereby forming the developing range. As illustrated in FIG. 3, the developing roller 26*a* includes stationary magnets 26*a*1 inside and a sleeve 26*a*2 that rotates around the magnets 26*al*. The magnets 26*al* generate multiple magnetic poles around the outer circumferential surface of the developing roller 26*a*.

Referring to FIGS. 2 and 3, the first conveying screw 26*b*1 and the second conveying screw 26*b*2 as conveyors convey the developer stored in the developing device 26 in a rotation axis direction of each of the first conveying screw 26*b*1 and the second conveying screw 26*b*2 (that is a direction perpendicular to the surface of the paper on which FIG. 2 is drawn, a lateral direction in FIG. 3, and the longitudinal direction of each of the first conveying screw 26*b*1 and the second conveying screw 26*b*2), thereby establishing a circulation path indicated by the dashed arrow in FIG. 3. In other words, the first conveying screw 26*b*1 establishes a first conveyance path B1, and the second conveying screw 26*b*2 establishes a second conveyance path B2. The circulation path of the developer includes the first conveyance path B1 and the second conveyance path B2.

The partition 26*e* is an inner wall and separates the first conveyance path B1 from the second conveyance path B2, and the first and second conveyance paths B1 and B2 communicate with each other via first and second communication openings 26*f* and 26*g* disposed at both ends of the first and second conveyance paths B1 and B2 in the rotation axis direction. Specifically, with reference to FIG. 3, in a conveyance direction of the developer, an upstream end of the first conveyance path B1 communicates with a downstream end of the second conveyance path B2 via the first communication opening 26*f* Additionally, in the conveyance direction of the developer, a downstream end of the first conveyance path B1 communicates with an upstream end of the second conveyance path B2 via the second communication opening 26*g*. In other words, the partition 26*e* is disposed along the circulation path in the rotation axis direction except both ends of the circulation path.

The first conveying screw 26*b*1 in the first conveyance path B1 is opposite the developing roller 26*a*, and the second conveying screw 26*b*2 in the second conveyance path B2 is opposite the first conveying screw 26*b*1 in the first conveyance path B1 via the partition 26*e*. The first conveying screw 26*b*1 supplies developer to the developing roller 26*a* and collects the developer that separates from the developing roller 26*a* after the development process while conveying the developer in the rotation axis direction. The second conveying screw 26*b*2 stirs and mixes the developer after the development process conveyed from the first conveyance path B1 with a fresh toner supplied from a replenishing port 26*d* while conveying the developer in the rotation axis direction.

In the present embodiment, the first and second conveying screws 26*b*1 and 26*b*2 are horizontally arranged in parallel. Each of the first and second conveying screws 26*b*1 and 26*b*2 includes a rotation shaft and a screw blade wound around the rotation shaft and is driven to rotate at about 600 revolutions per minute (rpm).

With reference to FIG. 2, the developing device 26 in the present embodiment includes a filter 26*t* disposed in an opening 26*k*1 communicating the inside and the outside of the developing device 26. Specifically, the opening 26*k*1 (that is a vent) through which air passes from the inside to the outside of the developing device 26 is formed on the ceiling of an upper developing case 26*k* as a developing case of the developing device 26. The filter 26*t* is disposed to close the opening 26*k*1. The filter 26*t* collects toner and ventilates the developing device 26.

Referring to FIG. 2, the developing device 26 in the present embodiment includes a lower developing case 26*j* in addition to the upper developing case 26*k* that serve as a casing (in other words, a housing) of the developing device 26. The lower developing case 26*j* is a casing serving as a base of the developing device 26. The lower developing case 26*j* rotatably holds the developing roller 26*a* and the conveying screws 26*b*1 and 26*b*2 and also holds the doctor blade 26*c* and an attachment 26*s* that is a holder holding the entrance seal 26*r*.

In contrast, the upper developing case 26*k* as the developing case is disposed so as to cover the upper portion of the developing roller 26*a* as the developer bearer. The upper developing case 26*k* is detachably attached to the lower developing case 26*j* holding the developing roller 26*a*, the conveying screws 26*b*1 and 26*b*2, and the doctor blade 26*c* by snap-on pins or screws.

A further detailed description is given of the image forming processes described above, focusing on the development process.

The developing roller 26*a* rotates in a predetermined direction that is counterclockwise indicated by an arrow in FIG. 2. As illustrated in FIGS. 2 and 3, the first conveying screw 26*b*1 and the second conveying screw 26*b*2 are disposed facing each other with the partition 26*e* interposed therebetween and rotate in directions indicated by arrows in FIGS. 2 and 3. Toner is supplied from the toner container 70 to the replenishing port 26*d* via a toner supply path. As the first conveying screw 26*b*1 and the second conveying screw 26*b*2 rotate in the respective directions in FIG. 2, the developer stored in the developing device 26 circulates in the rotation axis direction that is the longitudinal direction of the developing device 26, that is, the direction indicated by the dashed arrow in FIG. 3, and the supplied toner is stirred and mixed with the developer circulating.

Stirring the developer causes the toner to be charged by friction with carrier in the developer and electrostatically attracted to the carrier. A magnetic force is generated on the developing roller 26*a* to scoop up the carrier. The magnetic force that is called as a developer scooping pole scoops up the carrier with the toner on the developing roller 26*a*. The developer borne on the developing roller 26*a* is conveyed in the counterclockwise direction indicated by an arrow in FIG. 2 to a position opposite the doctor blade 26*c*. The doctor blade 26*c* adjusts an amount of the developer on the developing roller 26*a* at the position. Subsequently, rotation of the sleeve 26*a*2 conveys the developer to the developing range in which the developing roller 26*a* faces the photoconductor drum 21. An electric field formed in the developing range deposits toner on the electrostatic latent image formed on the photoconductor drum 21. As the sleeve 26*a*2 rotates, the developer remaining on the developing roller 26*a* reaches above the first conveyance path B1 and separates from the developing roller 26*a*. A development power supply applies a predetermined voltage as a developing bias to the developing roller 26*a*, and the charging process and the exposure process form a surface potential as a latent image potential on the photoconductor drum 21. The developing bias and the latent image potential form an electric field in the developing range.

The toner in the toner container 70 is supplied as appropriate through the toner supply passage to the developing device 26 via the replenishing port 26*d* as the toner in the developing device 26 is consumed. The toner consumption in the developing device 26 is detected by a toner concentration sensor that magnetically detects a toner concentration in the developer (i.e., the proportion of the toner in the developer) in the developing device 26.

The replenishing port 26*d* is disposed above an end of the second conveying screw 26*b*2 in the second conveyance path B2 in the rotation axis direction that is the left and right direction in FIG. 3.

The following describes a characteristic configuration and operation of the developing device 26 (the image forming apparatus 1) according to the present embodiment in detail.

As described above with reference to FIGS. 2 and 3, the developing device 26 includes the developing roller 26*a* as the developer bearer, the entrance seal 26*r* as the flexible sheet, and the attachment 26*s* as the holder holding the entrance seal 26*r*. The developing roller 26*a* as the developer bearer faces the photoconductor drum 21 as the image bearer and forms the developing range. The developing roller 26*a* develops the latent image formed on the surface of the photoconductor drum 21 in the developing range while the developing roller 26*a* rotates in a predetermined direction that is counterclockwise indicated by an arrow in each of FIGS. 2, 4A, and 4B.

Figure 4A:
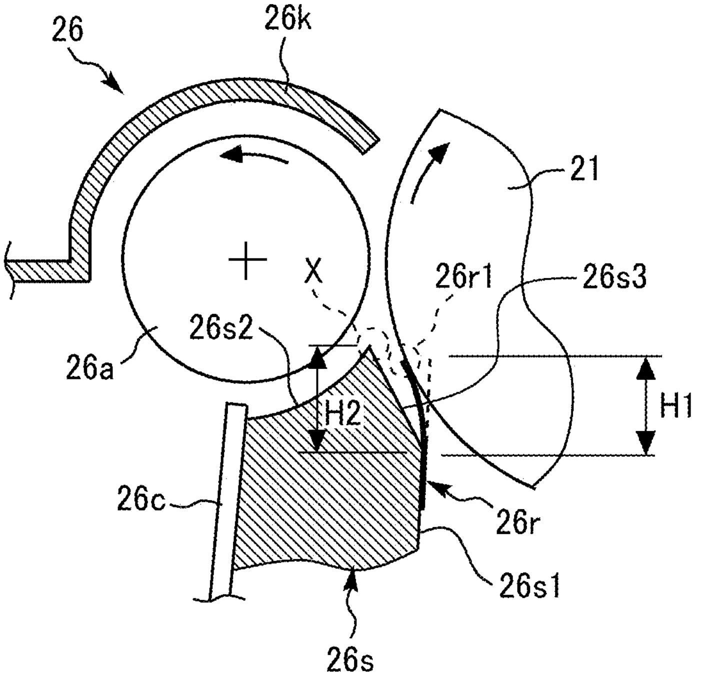
FIG. 4A is a cross-sectional view of a main part of the developing device in FIG. 3 and a part of a photoconductor drum in a cross section across the center of the developing roller in the rotation axis direction.

With reference to FIGS. 2 and 4A, the attachment 26*s* as the holder in the developing device 26 according to the present embodiment holds the entrance seal 26*r* as the flexible sheet in contact with the photoconductor drum 21 as the image bearer and supports the entrance seal 26*r* as a cantilever. The tip 26*r*1 of the entrance seal 26*r* as the flexible sheet is the free end (see FIG. 4A) and in contact with a portion of the photoconductor drum 21 as the image bearer, the portion upstream from the developing range in a rotation direction of the photoconductor drum 21. At this time, the tip **26*r*1 and a portion of the entrance seal 26*r* close to the tip 26*r*1 may contact the photoconductor drum 21, or a face of the entrance seal 26*r* may contact the photoconductor drum 21**.

Specifically, the lower developing case **26*j* holds the attachment 26*s* serving as the holder via the doctor blade 26*c*. The developing roller 26*a* forms the developing range at a portion in which the developing roller 26*a* faces the photoconductor drum 21. The attachment 26*s* faces a portion of the photoconductor drum 21 upstream from the developing range in the rotation direction of the photoconductor drum 21 indicated by the arrow in FIG. 4A or 4B. The attachment 26*s* faces a portion of the developing roller 26*a* downstream from the doctor blade 26*c* in a rotation direction of the developing roller 26*a* indicated by the arrow in FIG. 4A or 4**B.

Referring to FIG. 4A, the attachment **26*s* serving as the holder has a support face 26*s*1 as a first face, a facing face 26*s*2 as a second face, and a relay face 26*s*3** as a third face.

The support face **26*s*1 faces the photoconductor drum 21 as the image bearer and supports one end of the entrance seal 26*r* as a cantilever. In other words, the support face 26*s*1 defines a part of an outer face of the developing device and faces the photoconductor drum 21. Specifically, the support face 26*s*1 in the present embodiment has a plane extending downward in a substantially vertical direction that is a direction V perpendicular to a line connecting a center of the developing roller 26*a* and a center of the photoconductor drum 21 as illustrated in FIG. 2. The entrance seal 26*r* is adhered to the support face 26*s*1 by a double-sided adhesive tape. The tip 26*r*1 of the entrance seal 26*r* is the tip of the free end of the entrance seal 26*r* protruding from the support face 26*s*1 of the attachment 26*s*. The photoconductor drum 21 contacts the tip 26*r*1 and slides on the tip 26*r*1**.

The facing face **26*s*2 faces a portion of the developing roller 26*a* as the developer bearer upstream from the developing range in the rotation direction of the developing roller 26*a*. Specifically, the facing face 26*s*2 in the present embodiment has a curved face following the curvature of the developing roller 26*a* so that a gap between the facing face 26*s*2 and the developing roller 26*a*** is substantially constant.

The relay face **26*s*3 connects one end of the support face 26*s*1 closer to the developing range than the other end of the support face 26*s*1 and one end of the facing face 26*s*2 closer to the developing range than the other end of the facing face 26*s*2 and faces the photoconductor drum 21 as the image bearer. In other words, the relay face 26*s*3 defines another part of the outer face of the developing device and faces the photoconductor drum 21. As a result, the relay face 26*s*3 extends from the one end of the support face 26*s*1 to another end of the relay face 26*s*3 connected to the facing face 26*s*2 to form an acute tip portion X, and the acute tip portion X is closer to the developing range than the one end of the support face 26*s*1. Specifically, the relay face 26*s*3 in the present embodiment has a flat shape (or a curved shape) so that a gap between the relay face 26*s*3 and the photoconductor drum 21** is substantially constant.

In the present embodiment, the entrance seal **26*r* as the flexible sheet is a substantially rectangular urethane sheet having a small surface friction coefficient and a thickness of about 0.1 mm. The entrance seal 26*r* is positioned with respect to the photoconductor drum 21 to have a predetermined intrusion amount. The intrusion amount of the entrance seal with respect to the photoconductor drum is defined as a distance from an imaginary position of the tip of the entrance seal if the photoconductor drum does not exist to the surface of the photoconductor drum in a radial direction of the photoconductor drum. A dashed line extending from the entrance seal 26*r* in each of FIGS. 4A and 4B indicates an imaginary posture of the entrance seal 26*r* if the photoconductor drum 21 does not exist (if the developing device 26 itself exists and does not contact the photoconductor drum 21**).

In the present embodiment, the lower developing case **26*j* holds the attachment 26*s* via the doctor blade 26*c*, but the present disclosure is not limited to this method for holding the attachment 26*s*. For example, the lower developing case 26*j* may directly hold the attachment 26*s*, or the attachment 26*s* may be made as a part of the lower developing case 26*j*** as the developing case.

Since the above-described configuration of the attachment **26*s* positions the entrance seal 26*r* to be sufficiently away from the developing roller 26*a*, the above-described configuration reduces the developer accumulating on the surface of the entrance seal 26*r*. In addition, the above-described configuration reduces a labor hour to attach the entrance seal to the attachment 26*s* and a manufacturing cost regarding the entrance seal 26*r* compared with a configuration including two entrance seals overlapped and separated from each other to have different distances from the developing roller 26*a***.

FIG. 4A is a cross-sectional view of a part of the developing device in FIG. 3 and a part of the photoconductor drum in a cross section across the center of the developing roller in the rotation axis direction. In other words, FIG. 4A is the cross-sectional view in the cross section orthogonal to the rotation axis of the developing roller **26*a* as the developer bearer. A position of the cross section in the rotation axis direction is in a range M illustrated in FIG. 3 and not both ends of the developing device in the rotation axis direction. Both ends of the developing device in the rotation axis direction are in ranges indicated by "N" in FIG. 3. As illustrated in FIG. 4A, a first length H1 of the entrance seal 26*r* as the flexible sheet projecting from the one end of the support face 26*s*1 of the attachment 26*s*, that is, the first length H1 from the tip of the free end of the entrance seal 26*r* to the one end of the support face 26*s*1 closer to the developing range than the other end of the support face 26*s*1, is shorter than a second length of the relay face 26*s*3 from the acute tip portion X to the one end of the support face 26*s*1, in other words, the second length from a position at which the relay face 26*s*3 is connected to the support face 26*s*1 to a position at which the relay face 26*s*3 is connected to the facing face 26*s*2**.

As illustrated in FIG. 4A, which is the cross-sectional view in the above-described cross section, a position of the acute tip portion X at which the relay face **26*s*3 is connected to the facing face 26*s*2 is closer to the developing range than the tip 26*r*1 of the free end of the entrance seal 26*r* in the direction of FIG. 2**.

In addition, a height H2 in the vertical direction from the one end of the support face **26*s*1 to the acute tip portion X that is a tip of the attachment 26*s* as the holder is higher than a height from the one end of the support face 26*s*1 to the tip 26*r*1 of the entrance seal 26*r*. In other words, the acute tip portion X that is the tip of the attachment 26*s* as the holder protrudes to the developing range as compared with the tip 26*r*1 of the entrance seal 26*r***.

As described above, the acute tip portion X that is the tip of the attachment **26*s* holding the entrance seal 26*r* at the position sufficiently away from the developing roller 26*a* in the present embodiment protrudes from the tip 26*r*1 of the entrance seal 26*r* to the developing roller 26*a*. As a result, the entrance seal 26***r* is hidden by the attachment 26*s* (in other words, the relay face 26*s*3) when viewed from the developing roller 26*a*. Direct movement of the developer from the developing roller 26*a* to the entrance seal 26*r* is less likely to occur, which reduces the developer that adheres to and stays on the surface of the entrance seal 26*r*. As a result, the disadvantage caused by the developer on the entrance seal 26*r* is further sufficiently reduced.

Figure 8:
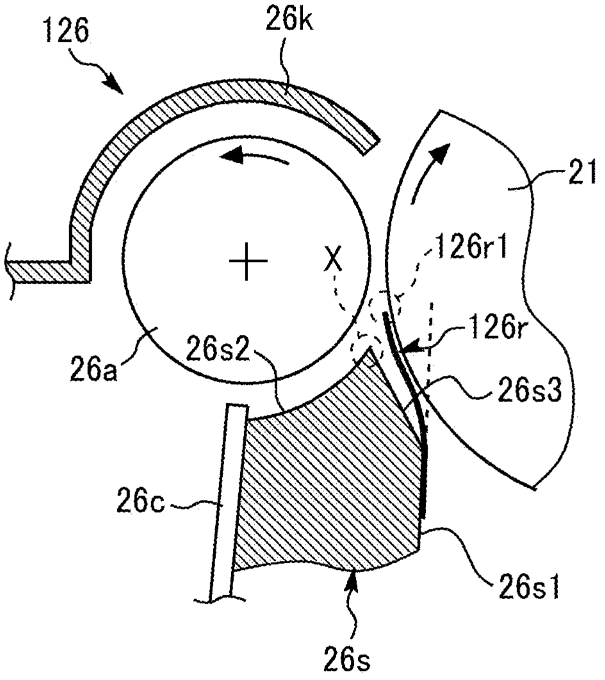
FIG. 8 RELATED ART
FIG. 8 is a cross-sectional view of a part of a developing device according to a comparative embodiment.

FIG. 8 is a cross-sectional view of a part of a developing device 126 according to a comparative embodiment. The developing device 126 includes the attachment 26*s* holding an entrance seal 126*r* at the position sufficiently away from the developing roller 26*a*. However, as illustrated in FIG. 8, the tip 126*r*1 of the entrance seal 126*r* protrudes from the acute tip portion X that is the tip of the attachment 26*s*. The entrance seal 126*r* is not hidden by the attachment 26*s* (in other words, the relay face 26*s*3) when viewed from the developing roller 26*a*. The entrance seal 126*r* is exposed. The developer can directly move from the developing roller 26*a* to the entrance seal 126*r*. As a result, the above-described structure cannot sufficiently reduce the disadvantage caused by the developer adhering to and staying on the surface of the entrance seal 126*r*.

In contrast, since the attachment 26*s* in the present embodiment prevents the entrance seal 26*r* from being exposed when viewed from the developing roller 26*a*, the structure in the present embodiment can sufficiently reduce the disadvantage caused by the developer adhering to and staying on the surface of the entrance seal 26*r*.

Figure 4B:
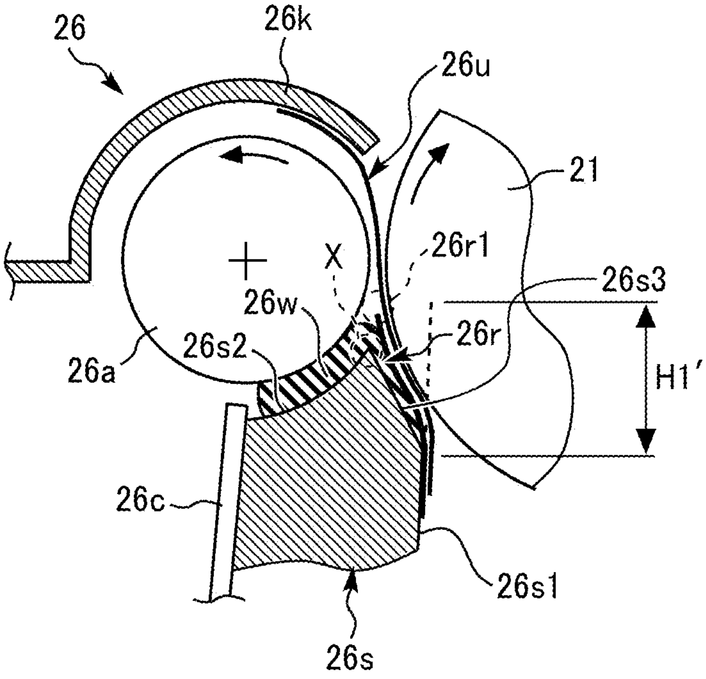
FIG. 4B is a cross-sectional view of a main part of the developing device in FIG. 3 and a part of a photoconductor drum in a cross section across an end of the developing roller in the rotation axis direction.
Figure 5:
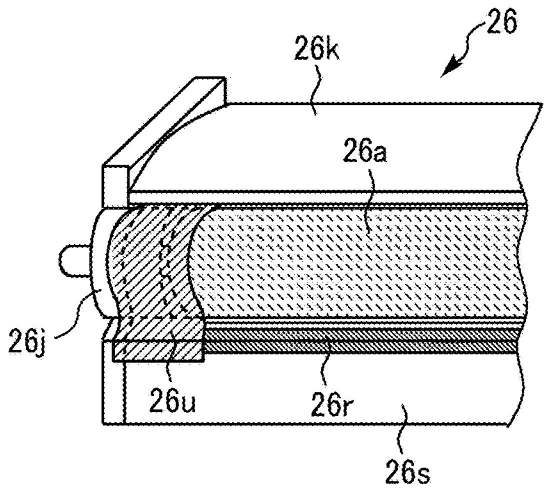
FIG. 5 is a schematic perspective view of a part of the developing device.

As illustrated in FIGS. 4B and 5, the developing device 26 according to the present embodiment includes side seals 26*u* as second flexible sheets and sponge seals or elastic seals 26*w* which are elastic disposed on both end portions of the developing device 26 in the rotation axis direction.

One end of the side seal 26*u* as the second flexible sheet is adhered to the support face 26*s*1 of the attachment 26*s* so that the side seal 26*u* covers one end of the developing roller 26*a* as the developer bearer in the rotation axis direction (the one end of the developing roller is in the range N illustrated in FIG. 3). The attachment 26*s* supports the side seal 26*u*. The side seal 26*u* seals the gap between the one end of the developing roller 26*a* in the rotation axis direction and the developing case including the upper developing case 26*k*, the lower developing case 26*j*, and the attachment 26*s* and covering the developing roller 26*a*. The side seal 26*u* reduces the toner scattered from one end of the developing device 26 (specifically, from the gap between the one end of the developing roller 26*a* and the developing case including the upper developing case 26*k*, the lower developing case 26*j*, and the attachment 26*s*).

In the present embodiment, the one end of the side seal 26*u* is adhered to the lower developing case 26*j* in addition to the attachment 26*s*. The side seal 26*u* may be adhered to the lower developing case 26*j* and the upper developing case 26*k* or may be adhered to the lower developing case 26*j*, the upper developing case 26*k*, and the attachment 26*s*. Adhering the side seal 26*u* to the upper developing case 26*k* further reduces the disadvantages caused by the side seal 26*u* peeled off due to the friction force with the developing roller 26*a*. In the present embodiment, the side seal 26*u* is a substantially rectangular urethane sheet having a small surface friction coefficient and a thickness of about 0.1 mm.

The sponge seal 26*w* is disposed on (and adhered to) an end of the facing face 26*s*2 and an end of the relay face 26*s*3 of the attachment 26*s* as the holder in the rotation axis direction so as to straddle the facing face 26*s*2 and the relay face 26*s*3. In other words, the sponge seal 26*w* covers a part of a longitudinal end of the facing face 26*s*2 in the rotation axis direction (in other words, an axial direction) and a longitudinal end of the relay face 23*s*3 in the axial direction.

Specifically, the sponge seal 26*w* faces one end of the photoconductor drum 21 in the rotation axis direction via the side seal 26*u* (and the entrance seal 26*r*), and the surface of one end of the developing roller 26*a* in the rotation axis direction is in sliding contact with the sponge seal 26*w*. The sponge seal 26*w* in the present embodiment is made of an elastic material such as foamed polyurethane that is elastically deformable. The thickness of the sponge seal 26*w* that does not elastically deform is larger than at least the gap between the developing roller 26*a* and the facing face 26*s*2.

The sponge seal 26*w* disposed as described above seals the gap between the one end of the developing roller 26*a* in the rotation axis direction and one end of the facing face 26*s*2 in the rotation axis direction and the gap between one end of the relay face 26*s*3 in the rotation axis direction and the side seal 26*u* (and the entrance seal 26*r*), which reduces the toner scattered from one end of the developing device 26.

Referring to FIG. 4B, an end of the entrance seal 26*r* as the flexible sheet in the present embodiment in the rotation axis direction is sandwiched by the side seal 26*u* as the second flexible sheet and the support face 26*s*1 and supported (adhered) on the support face 26*s*1. As a result, the side seal 26*u* is located closer to the photoconductor drum 21 than the entrance seal 26*r*. The sponge seal 26*w* is located between the relay face 26*s*3 and the entrance seal 26*r*.

FIG. 4B is a cross-sectional view of an end of the developing device in the rotation axis direction in a cross section orthogonal to the rotation axis direction. As illustrated in FIG. 4B, the entrance seal 26*r* as the flexible sheet projects from the one end of the support face 26*s*1, the one end closer to the developing range than the other end of the support face 26*s*1, and a third length H' from the one end of the support face 26*s*1 to the tip of the free end of the longitudinal end of the entrance seal 26*r* is longer than the second length of the relay face 26*s*3 in the longitudinal end of the developing device in the rotation axis direction.

In other words, the tip 26*r*1 of the entrance seal 26*r* does not project from the acute tip portion X that is the tip of the attachment 26*s* in a center region of the developing device in the rotation axis direction (that is the range M in FIG. 3). However, in each of both end regions of the developing device in the rotation axis direction (that is the ranges N in FIG. 3), the tip 26*r*1 of the entrance seal 26*r* projects from the acute tip portion X that is the tip of the attachment 26*s* in the vertical direction.

Figure 6:
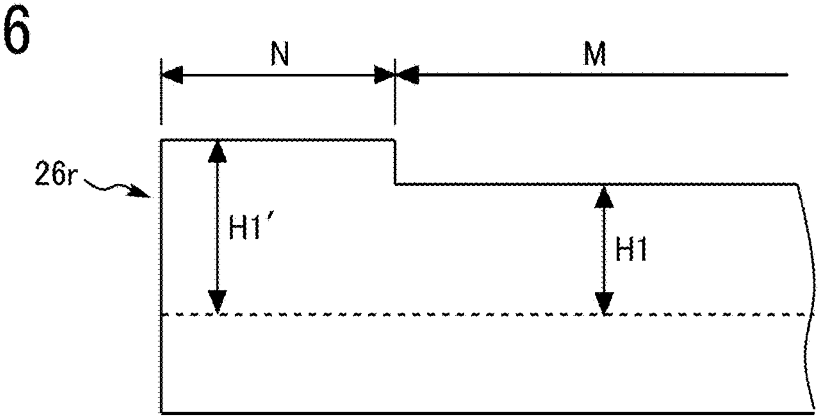
FIG. 6 is a front view of a part of a flexible sheet.

Accordingly, the entrance seal 26*r* itself has a from as illustrated in FIG. 6. A projection amount H' in each of both end portions of the entrance seal 26*r* is larger than a projection amount H in the center portion of the entrance seal 26*r*. The entrance seal 26*r* has a substantially U-shape.

The entrance seal 26*r* entirely covering the sponge seal 26*w* on each of both end portions of the relay face 26*s*3 in the rotation axis direction more easily seals the gap between the relay face 26*s*3 and the side seal 26*u* (and the entrance seal 26*r*) than the entrance seal having a small projection amount and not entirely covering the sponge seal. As a result, the above described configuration further reduces the toner scattered from both ends of the developing device 26.

Figure 7A:
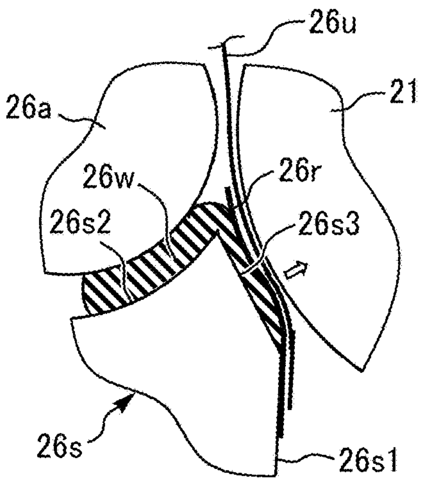
FIGS. 7A and 7B are enlarged cross-sectional views of the main parts of the developing device.

As illustrated in FIG. 7A, the sponge seal 26*w* in the present embodiment is disposed on the relay face 26*s*3 so as to be in pressure contact with the photoconductor drum 21 as the image bearer via the entrance seal 26*r* as the flexible sheet and the side seal 26*u* as the second flexible sheet.

Specifically, the thickness and shape of the sponge seal 26*w* are set such that a repulsive force due to elastic deformation is generated in a direction indicated by a white arrow in FIG. 7A. For example, a sum of a thickness of the sponge seal 26*w* on the relay face 26*s*3, a thickness of the entrance seal 26*r*, and a thickness of the side seal 26*u* is larger than a distance from the relay face 26*s*3 to the photoconductor drum 21 as the image bearer. As a result, the sponge seal 26*w*, the entrance seal 26*r*, the side seal 26*u*, and the photoconductor drum 21 are brought into close contact with each other without any gaps.

Figure 7B:
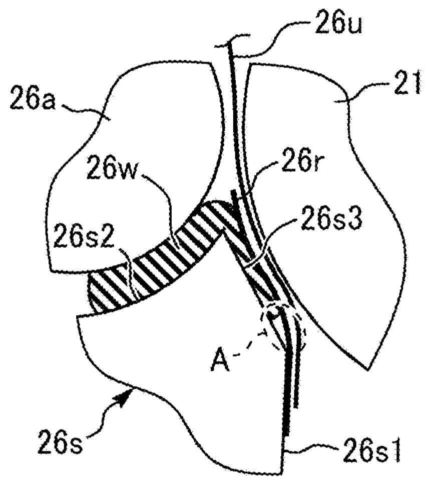

The above-described configuration can reduce toner scattering caused by a gap A illustrated in FIG. 7B between the sponge seal 26*w* and the entrance seal 26*r* (or a gap formed by the side seal 26*u* and the photoconductor drum 21).

In the present embodiment, the developing device 26 is attachable to and detachable from the process cartridge 20 installed in the image forming apparatus 1.

When the developing device 26 is installed in or removed from the process cartridge 20 (in particular, installed in the process cartridge), contacting the entrance seal 26*r* onto the photoconductor drum 21 may turn up or fold the entrance seal 26*r*. In order to prevent the entrance seal 26*r* from being turned up or folded, the image forming apparatus 1 preferably includes a guide rail to guide attachment and detachment of the developing device 26. The guide rail guides the developing device 26 from a position above a final installation position and away from the photoconductor drum 21 to a position at which a face of the entrance seal 26*r* comes into contact with the photoconductor drum 21. After the face of the entrance seal 26*r* contacts the photoconductor drum 21, the guide rail guides the developing device 26 downward to the final installation position so that the entrance seal 26*r* contacts the photoconductor drum 21 at a target position of the entrance seal 26*r*.

The following describes a first modification of the present embodiment.

Figure 9:
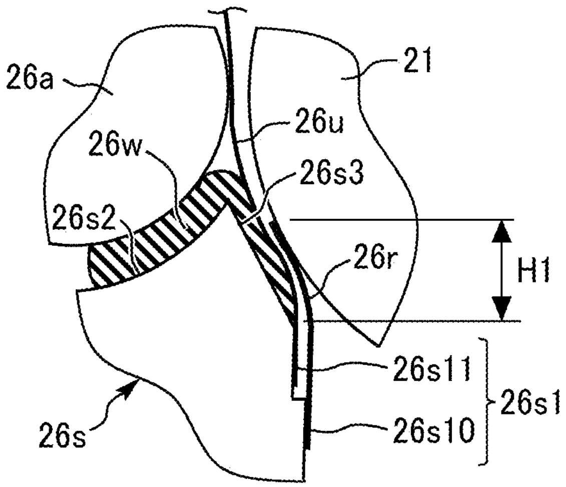
FIG. 9 is a cross-sectional view of a part of a developing device according to a modification of the embodiment of the present disclosure.

As illustrated in FIG. 9, the side seal 26*u* as the second flexible sheet in the developing device 26 according to the first modification is supported on (and adhered to) the end of the support face 26*s*1 in the rotation axis direction and is interposed between the longitudinal end of the entrance seal 26*r* as the flexible sheet and the end of the support face 26*s*1 in the rotation axis direction.

Unlike the embodiment illustrated in FIG. 4B, the entrance seal 26*r* in the first modification is located closer to the photoconductor drum 21 than the side seal 26*u*. In addition, the sponge seal 26*w* on the relay face 26*s*3 is located between the relay face 26*s*3 and the side seal 26*u*.

As illustrated in FIG. 9, the length H1 of the entrance seal 26*r* as the flexible sheet protruding from the one end of the support face 26*s*1 closer to the developing range than the other end of the support face 26*s*1 is shorter than the length of the relay face 26*s*3 when viewed in the cross section orthogonal to the rotation axis. Specifically, the entrance seal 26*r* in the first modification does not project from the acute tip portion X that is the tip of the attachment 26*s* not only in the range M but also in the range N in FIG. 3. In other words, a third length of the entrance seal 26*r* from a tip of the free end of the longitudinal end of the entrance seal 26*r* to the one end of the support face 26*s*1 is shorter than the second length of the relay face from the acute tip portion X to the one end of the support face 26*s*1 throughout the axial direction. The entrance seal 26*r* itself in the first modification has a substantially rectangular shape so as to have a uniform projection amount H over the longitudinal direction of the entrance seal 26*r*.

In a case in which the end of the entrance seal 26*r* in the rotation axis direction is located closer to the photoconductor drum 21 than the side seal 26*u*, the projection amount of the entrance seal 26*r* does not change the degree of sealing of the gap between the side seal 26*u* and the sponge seal 26*w*. Thus, the projection amount of the entrance seal 26*r* is set to be uniform over the rotation axis direction.

The end of the support face 26*s*1 of the attachment 26*s* as the holder in the rotation axis direction has a step having a face 26*s*11 supporting the side seal 26*u* as the second flexible sheet and being farther from the photoconductor drum 21 (or closer to the developing roller 26*a*) than the other face 26*s*10. In other words, the longitudinal end of the support face of the holder in the axial direction has a step having a first face on which the entrance seal is attached and a second face on which the side seal is attached, and the second face closer to the developer bearer than the first face.

If the face 26*s*11 to which the side seal 26*u* is adhered and the face 26*s*10 to which the entrance seal 26*r* is adhered are in the same plane, deformation of the end of the entrance seal 26*r* in the rotation axis direction that is closer to the photoconductor drum 21 than the side seal is likely to change a posture of the side seal 26*u*. Bringing the face 26*s*11 to which the side seal 26*u* is adhered closer to the sponge seal 26*w* than the face 26*s*10 to which the entrance seal 26*r* is adhered is less likely to cause changing the posture of the side seal 26*u*, and the function of the side seal 26*u* is stably exhibited.

As a result, the developing device 26 according to the first modification can efficiently and sufficiently reduce the disadvantage caused by the developer staying on the entrance seal 26*r*.

As described above, the developing device 26 according to the present embodiment includes the developing roller 26*a* as the developer bearer that faces (or contacts) the photoconductor drum 21 as the image bearer to form the developing range and develops the latent image formed on the photoconductor drum 21 in the developing range while rotating in a predetermined rotation direction. In addition, the developing device 26 according to the present embodiment includes the entrance seal 26*r* as the flexible sheet and the attachment 26*s* as the holder to hold the entrance seal 26*r*. The entrance seal 26*r* has the tip 26*r*1 that is the free end contacting the photoconductor drum 21 at the position upstream from the developing range in a rotation direction of the photoconductor drum 21. The attachment 26*s* has the support face 26*s*1, the facing face 26*s*2, and the relay face 26*s*3. The support face 26*s*1 cantilevers the entrance seal 26*r* and faces the photoconductor drum 21. The facing face 26*s*2 faces the portion of the developing roller 26*a* upstream from the developing range in the rotation direction of the developing roller 26*a*. The relay face 26*s*3 connects the end of the support face 26*s*1 closer to the developing range than the other end of the support face 26*s*1 and the end of the facing face 26*s*2 closer to the developing range than the other end of the facing face 26*s*2 and faces the photoconductor drum 21. The length H1 of the entrance seal 26*r* protruding from the end of the support face 26*s*1 that is closer to the developing range than the other end of the support face 26*s*1 is shorter than the length of the relay face 26*s*3 when viewed in the cross section that is orthogonal to the rotation axis of the developing roller 26*a* and is at a position in the range M illustrated in FIG. 3 in the rotation axis direction, that is, the range other than the range N in the rotation axis direction.

The above-described configuration can efficiently and sufficiently reduce the disadvantage caused by the developer staying on the entrance seal 26*r*.

In the present embodiment, the process cartridge 20 does not include the developing device 26, and the developing device 26 is a unit that can be independently installed in and removed from the body of the image forming apparatus 1. In contrast, the developing device 26 may be one of the constituent members of the process cartridge 20, and the process cartridge 20 may be configured to be integrally installed in and removed from the body of the image forming apparatus 1.

In such a configuration, similar effects to those of the above-described embodiment and modification are also attained.

It is to be noted that the term "process cartridge" used in the present disclosure means a removable unit including an image bearer and at least one of a charging device to charge the image bearer, a developing device to develop latent images on the image bearer, and a cleaning device to clean the image bearer that are united together, and is designed to be removably installed as a united part in the body of the image forming apparatus.

In the present embodiment according to the present disclosure, the developing device 26 includes two conveying screws 26*b*1 and 26*b*2 as the conveyors horizontally arranged in parallel and the doctor blade 26*c* disposed below the developing roller 26*a*. The configuration of the developing device to which the present disclosure is applied is not limited to the above-described configurations. The present disclosure may be applied to other developing devices such as a developing device in which three or more conveyors are arranged in parallel in the horizontal direction, a developing device in which multiple conveyors are arranged in parallel in the vertical direction, and a developing device in which the doctor blade is disposed above the developing roller.

In the above-described embodiments, the present disclosure is applied to the developing device 26 in which the developing roller is disposed across a gap from the photoconductor drum 21 as the image bearer to form the developing range. Alternatively, the present disclosure can be applied to a developing device employing a contact type one-component development method, in which a developing roller is in contact with an image bearer to form the developing range.

Such cases also provide substantially the same effects as the effects described above.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. The number, position, and shape of the components described above are not limited to those embodiments described above. Desirable number, position, and shape can be determined to perform the present disclosure.

Aspects of the present disclosure are, for example, as follows.

(First Aspect)

In a first aspect, a developing device includes a developer bearer, a holder, and an entrance seal. The developer bearer is rotatable in a rotation direction and forms a developing range to develop a latent image on an image bearer. The holder has a facing face, a support face, and a relay face. The facing face faces a portion of the developer bearer upstream from the developing range in the rotation direction of the developer bearer. The support face defines a part of an outer face of the developing device. The relay face extends from one end of the support face to one end of the relay face connected to the facing face to form an acute tip portion. The acute tip portion is closer to the developing range than the one end of the support face. The entrance seal has a free end projecting from the one end of the support face as a cantilever, and a first length of the entrance seal from a tip of the free end of the entrance seal to the one end of the support face is shorter than a second length of the relay face from the acute tip portion to the one end of the support face at least at a part of a center portion of the entrance seal in a longitudinal direction of the entrance seal.

(Second Aspect)

In a second aspect, the acute tip portion in the developing device according to the first aspect is closer to the developing range than the tip of the free end of the entrance seal in a direction perpendicular to a line connecting a center of the developer bearer and a center of the image bearer.

(Third Aspect)

In a third aspect, The developing device according to the first aspect or the second aspect further includes a side seal and an elastic sheet. The side seal is supported by the support face of the holder and covering a longitudinal end of the developer bearer in an axial direction of the developer bearer. The elastic sheet covers a part of a longitudinal end of the facing face in the axial direction and a longitudinal end of the relay face in the axial direction.

(Fourth Aspect)

In a fourth aspect, a longitudinal end of the entrance seal in the axial direction in the developing device according to the third aspect is interposed between the side seal and the support face, and a third length of the entrance seal from a tip of the free end of the longitudinal end of the entrance seal to the one end of the support face is longer than the second length of the relay face from the acute tip portion to the one end of the support face.

(Fifth Aspect)

In a fifth aspect, the side seal in the developing device according to the third aspect is interposed between the support face and a longitudinal end of the entrance seal in the axial direction, and a third length of the entrance seal from a tip of the free end of the longitudinal end of the entrance seal to the one end of the support face is shorter than the second length of the relay face from the acute tip portion to the one end of the support face throughout the axial direction.

(Sixth Aspect)

In a sixth aspect, the developing device according to the third aspect or the fifth aspect has the following structure. The longitudinal end of the support face of the holder in the axial direction has a step having a first face and a second face. On the first face, the entrance seal is attached. On the second face, the side seal is attached. The second face is closer to the developer bearer than the first face.

(Seventh Aspect)

In a seventh aspect, a process cartridge includes an image bearer and the developing device according to any one of the first to the sixth aspects.

(Eighth Aspect)

In an eighth aspect, an image forming apparatus includes an image bearer and the developing device according to any one of the fourth, fifth, and sixth aspects, and a sum of a thickness of the elastic sheet on the relay face, a thickness of the entrance seal, and a thickness of the side seal is larger than a distance from the relay face to the image bearer.

(Ninth Aspect)

In a ninth aspect, an image forming apparatus includes the developing device according to any one of the first to eighth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A developing device comprising:

a developer bearer rotatable in a rotation direction and forming a developing range to develop a latent image on an image bearer;

a holder including:

a facing face which faces a portion of the developer bearer upstream from the developing range in the rotation direction of the developer bearer;

a support face defining a part of an outer face of the developing device; and a relay face extending from one end of the support face to one end of the relay face connected to the facing face to form an acute tip portion, the acute tip portion closer to the developing range than the one end of the support face; and an entrance seal including a free end projecting along a length of the entrance seal from the one end of the support face as a cantilever, wherein:

a first length of the entrance seal from a tip of the free end of the entrance seal to the one end of the support face is shorter than a second length of the relay face from the acute tip portion to the one end of the support face at least at a part of a center portion of the entrance seal in a longitudinal direction of the entrance seal, a side of the entrance seal which extends along the length of the entrance seal contacting the image bearer at a point of contact, and the entrance seal being substantially tangent to the image bearer at the point of contact, the developing device further comprising:

a side seal supported by the support face of the holder and covering a longitudinal end of the developer bearer in an axial direction of the developer bearer; and an elastic seal covering a part of a longitudinal end of the facing face in the axial direction and a longitudinal end of the relay face in the axial direction.

2. The developing device according to claim 1, wherein the acute tip portion is closer to the developing range than the tip of the free end of the entrance seal in a direction perpendicular to a line connecting a center of the developer bearer and a center of the image bearer.

3. The developing device according to claim 1, wherein;

a longitudinal end of the entrance seal in the axial direction is interposed between the side seal and the support face, and a third length of the entrance seal from a tip of the free end of the longitudinal end of the entrance seal to the one end of the support face is longer than the second length of the relay face from the acute tip portion to the one end of the support face.

4. The developing device according to claim 1, wherein;

the side seal is interposed between the support face and a longitudinal end of the entrance seal in the axial direction, and a third length of the entrance seal from a tip of the free end of the longitudinal end of the entrance seal to the one end of the support face is shorter than the second length of the relay face from the acute tip portion to the one end of the support face throughout the axial direction.

5. The developing device according to claim 1, wherein;

the longitudinal end of the support face of the holder in the axial direction has a step including:

a first face on which the entrance seal is attached; and a second face on which the side seal is attached, the second face closer to the developer bearer than the first face.

6. A process cartridge comprising:

an image bearer; and the developing device according to claim 1.

7. An image forming apparatus comprising:

an image bearer; and the developing device according to claim 3, wherein a sum of a thickness of the elastic seal on the relay face, a thickness of the entrance seal, and a thickness of the side seal is larger than a distance from the relay face to the image bearer.

8. An image forming apparatus comprising:

the developing device according to claim 1.

9. A developing device comprising:

a developer bearer rotatable in a rotation direction and forming a developing range to develop a latent image on an image bearer;

a holder including:

a facing face which faces a portion of the developer bearer upstream from the developing range in the rotation direction of the developer bearer;

a support face defining a part of an outer face of the developing device; and a relay face extending from one end of the support face to one end of the relay face connected to the facing face to form an acute tip portion, the acute tip portion closer to the developing range than the one end of the support face; and an entrance seal including a free end projecting from the one end of the support face as a cantilever, wherein a first length of the entrance seal from a tip of the free end of the entrance seal to the one end of the support face is shorter than a second length of the relay face from the acute tip portion to the one end of the support face at least at a part of a center portion of the entrance seal in a longitudinal direction of the entrance seal, the developing device further comprising:

a side seal supported by the support face of the holder and covering a longitudinal end of the developer bearer in an axial direction of the developer bearer; and an elastic seal covering a part of a longitudinal end of the facing face in the axial direction and a longitudinal end of the relay face in the axial direction.

10. The developing device according to claim 9, wherein a longitudinal end of the entrance seal in the axial direction is interposed between the side seal and the support face, and a third length of the entrance seal from a tip of the free end of the longitudinal end of the entrance seal to the one end of the support face is longer than the second length of the relay face from the acute tip portion to the one end of the support face.

11. The developing device according to claim 9, wherein the side seal is interposed between the support face and a longitudinal end of the entrance seal in the axial direction, and a third length of the entrance seal from a tip of the free end of the longitudinal end of the entrance seal to the one end of the support face is shorter than the second length of the relay face from the acute tip portion to the one end of the support face throughout the axial direction.

12. The developing device according to claim 9, wherein the longitudinal end of the support face of the holder in the axial direction has a step including:

a first face on which the entrance seal is attached; and a second face on which the side seal is attached, the second face closer to the developer bearer than the first face.

13. A process cartridge comprising:

an image bearer; and the developing device according to claim 9.

14. An image forming apparatus comprising:

an image bearer; and the developing device according to claim 11, wherein a sum of a thickness of the elastic seal on the relay face, a thickness of the entrance seal, and a thickness of the side seal is larger than a distance from the relay face to the image bearer.

15. An image forming apparatus comprising:

the developing device according to claim 9.

* * * * *